(12) United States Patent
Saiki et al.

(10) Patent No.: US 11,645,020 B2
(45) Date of Patent: May 9, 2023

(54) IMAGE FORMING APPARATUS AND APPARATUS

(71) Applicant: CANON KABUSHIKI KAISHA, Tokyo (JP)

(72) Inventors: Kenji Saiki, Moriya (JP); Kyosuke Nakano, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/581,681

(22) Filed: Jan. 21, 2022

(65) Prior Publication Data

US 2022/0147288 A1 May 12, 2022

Related U.S. Application Data

(63) Continuation of application No. 16/663,670, filed on Oct. 25, 2019, now Pat. No. 11,269,569.

(30) Foreign Application Priority Data

Nov. 7, 2018 (JP) .............................. JP2018-209771

(51) Int. Cl.
*G06F 3/12* (2006.01)
*G03G 15/08* (2006.01)

(52) U.S. Cl.
CPC ....... *G06F 3/1229* (2013.01); *G03G 15/0849* (2013.01); *G03G 15/0877* (2013.01); *G06F 3/1204* (2013.01); *G06F 3/1205* (2013.01); *G06F 3/1219* (2013.01); *G06F 3/1239* (2013.01)

(58) Field of Classification Search
CPC .... G06F 3/1229; G06F 3/1204; G06F 3/1205; G06F 3/1219; G06F 3/1239; G03G 15/0849; G03G 15/0877; G03G 15/502
See application file for complete search history.

(56) References Cited

U.S. PATENT DOCUMENTS

| | | | |
|---|---|---|---|
| 11,269,569 B2* | 3/2022 | Saiki | G06F 3/1205 |
| 2013/0078002 A1* | 3/2013 | Stelter | G03G 15/0893 |
| | | | 399/254 |
| 2017/0346956 A1* | 11/2017 | Nakamura | G06F 3/1262 |

FOREIGN PATENT DOCUMENTS

| | | |
|---|---|---|
| JP | 2000-330413 A | 11/2000 |
| JP | 2002-372813 A | 12/2002 |
| JP | 2009-169191 A | 7/2009 |

(Continued)

*Primary Examiner* — Iriana Cruz
(74) *Attorney, Agent, or Firm* — Canon U.S.A., Inc. I.P. Divsion

(57) ABSTRACT

An image forming apparatus includes an acquisition unit and a determination unit. The acquisition unit acquires a print setting about at least one of items including a size of a recording medium used for printing, a type of the recording medium, and a conveyance speed of the recording medium. The determination unit determines a printing method to be executed among a plurality of printing methods including a first printing method for drawing an image having a density and a second printing method for drawing an image having a density that is higher than the density of an image printed by the first printing method. Where the print setting is acquired by the acquisition unit, the determination unit determines whether to permit execution of printing by the second printing method based on the print setting acquired by the acquisition unit.

20 Claims, 14 Drawing Sheets

TWO-SIDED PRINTING IS
NOT AVAILABLE WHEN
EXTENDED GAMUT
PRINTING IS SET.

(56) References Cited

FOREIGN PATENT DOCUMENTS

| | | | |
|---|---|---|---|
| JP | 2012-247552 | A | 12/2012 |
| JP | 2018-054862 | A | 4/2018 |

* cited by examiner

FIG.4

PRINT SETTINGS

SHEET SIZE
[ A4 ▼ ]

SHEET TYPE
[ PLAIN PAPER ▼ ]

ONE-SIDED/TWO-SIDED
[ ONE-SIDED ▼ ]

NUMBER OF COPIES
[ 1 ▼ ]

COLOR MODE
[ COLOR ▼ ]

OUTPUT TYPE
[ NORMAL ▼ ]
NORMAL
EXTENDED GAMUT

FIG.8

| SHEET TYPE | CONVEYANCE SPEED IN EXTENDED GAMUT PRINTING |
|---|---|
| THIN PAPER | NOT EXECUTABLE |
| PLAIN PAPER | 1/2, 1/3 |
| THICK PAPER 1 | 1/2, 1/3 |
| THICK PAPER 2 | 1/3 |
| THICK PAPER 3 | NOT EXECUTABLE |
| COATED PAPER 1 | 1/3 |
| COATED PAPER 2 | 1/3 |

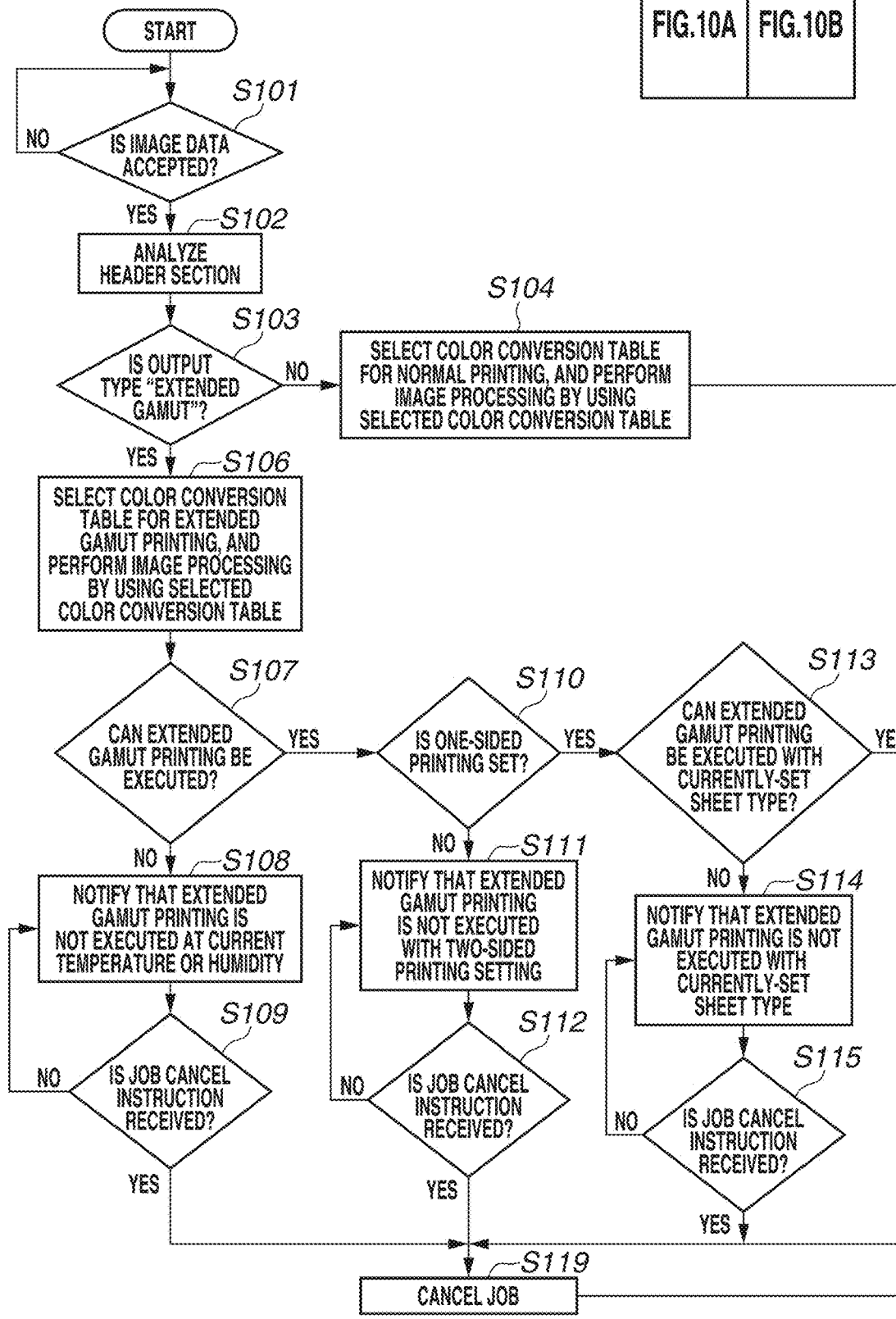

FIG.11A

EXTENDED GAMUT PRINTING IS UNABLE TO BE STARTED.

FIG.11B

TWO-SIDED PRINTING IS NOT AVAILABLE WHEN EXTENDED GAMUT PRINTING IS SET.

FIG.11C

SELECTED SHEET TYPE IS NOT USABLE WHEN EXTENDED GAMUT PRINTING IS SET.

FIG.11D

SELECTED SHEET SIZE IS NOT USABLE WHEN EXTENDED GAMUT PRINTING IS SET.

IMAGE FORMING APPARATUS AND APPARATUS

CROSS REFERENCE TO RELATED APPLICATIONS

This application is a continuation of U.S. patent application Ser. No. 16/663,670, filed on Oct. 25, 2019, which claims priority from Japanese Patent Application No. 2018-209771, filed Nov. 7, 2018, each of which are hereby incorporated by reference herein in their entirety.

BACKGROUND

Field

The present disclosure relates to processing for performing image formation with an increased amount of applied toner by changing a peripheral speed ratio between a developing roller and a photosensitive drum.

Description of the Related Art

An electrophotographic image forming apparatus performs recording by forming an electrostatic latent image on a photosensitive drum, developing the electrostatic latent image by application of toner to the photosensitive drum by a developing device, and transferring the toner from the photosensitive drum to a recording sheet (recording medium).

Concerning such an image forming apparatus, a method for increasing the amount of toner supplied to the photosensitive drum by making a peripheral speed ratio of a developing roller to the photosensitive drum higher than usual has been discussed. Increasing the amount of toner supply enables extended gamut printing in which the density of an output image is increased to make the gamut of colors that can be expressed in the image wider than usual (Japanese Patent Application Laid-Open No. 5-241436).

Extended gamut printing widens the range of colors that can be expressed. Without appropriate print settings, however, extended gamut printing can cause a fixing failure (such as color unevenness and toner separation) or cause the recording medium to get caught around the photosensitive drum.

For example, extended gamut printing raises the upper limit of the amount of applied toner. To fix the toner to the recording medium, a sufficient fixing temperature therefore needs to be ensured. In performing drawing on thick paper or at ends of a sheet having a large sheet width, a sufficient fixing temperature is difficult to provide and a fixing failure can occur.

Meanwhile, if the recording medium has a small thickness, the recording medium absorbs less heat and the temperature of the fixing device tends to be increased. If the temperature of the fixing device is raised to perform extended gamut printing, excessive melting of toner can cause a winding phenomenon in which the recording medium gets caught around the fixing device.

Extended gamut printing can also cause a phenomenon called end portion temperature increase if a sheet of appropriate size is not used.

SUMMARY

According to an aspect of the present disclosure, an image forming apparatus includes an acquisition unit configured to acquire a print setting about at least one of items including a size of a recording medium used for printing, a type of the recording medium, and a conveyance speed of the recording medium, and a determination unit configured to determine a printing method to be executed among a plurality of printing methods including a first printing method for drawing an image having a density and a second printing method for drawing an image having a density that is higher than the density of an image printed by the first printing method, wherein, in a case where the print setting is acquired by the acquisition unit, the determination unit determines whether to permit execution of printing by the second printing method based on the print setting acquired by the acquisition unit.

Further features of the present disclosure will become apparent from the following description of exemplary embodiments with reference to the attached drawings.

BRIEF DESCRIPTION OF THE DRAWINGS

FIG. 4 illustrates an example of a user interface (UI) for making print settings on a personal computer (PC) according to the first exemplary embodiment.

FIG. 8 is a table illustrating sheet types and the executability and speeds of extended gamut printing according to the first exemplary embodiment.

FIGS. 11A, 11B, 11C, and 11D illustrate examples of an error display according to the first exemplary embodiment.

DESCRIPTION OF THE EMBODIMENTS

Figure 1:
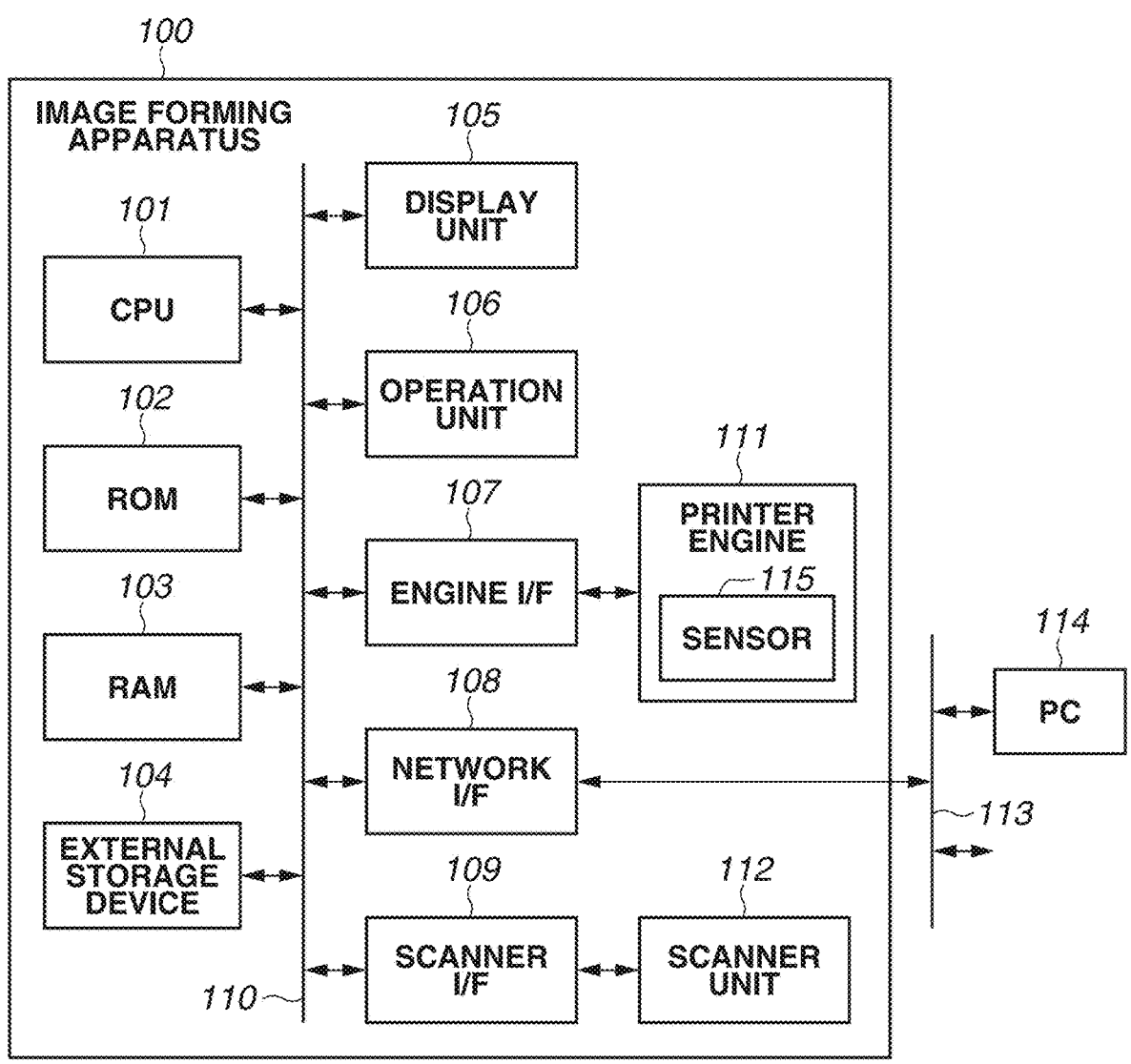
FIG. 1 is a block diagram illustrating a system configuration of an image forming apparatus according to a first exemplary embodiment.

Exemplary embodiments for carrying out the present disclosure will be described below with reference to the drawings. The following exemplary embodiments are not intended to limit the disclosure set forth in the claims, and all combinations of features described in the exemplary embodiments are not necessarily indispensable to the disclosure.

A first exemplary embodiment will be described below. The types of printing methods that can be executed by an image forming apparatus 100 according to the present exemplary embodiment include normal printing and extended gamut printing. Extended gamut printing refers to a printing method for outputting an image expressed by using a wider gamut of colors than can be expressed during normal printing by performing drawing at densities higher than can be performed during normal printing. For example, in expressing red, richer (deeper) red can be expressed by fixing more toner than the upper limit value of the amount of applied toner fixable to a recording medium (recording sheet) during normal printing. Extended gamut printing can express colors of high saturations, compared to normal printing.

Extended gamut printing is implemented by increasing the peripheral speed ratio of a peripheral speed of a developing roller 303 to a peripheral speed of a photosensitive drum 304 (increasing the ratio of the peripheral speed of the developing roller 303 to that of the photosensitive drum 304) during normal printing. Increasing the peripheral speed ratio increases the amount of toner supplied to the photosensitive drum 304 per unit time, whereby a visualized image with a greater amount of applied toner can be formed on the photosensitive drum 304.

In the present exemplary embodiment, the peripheral speed refers to the speed of the surface of the photosensitive drum 304 or the developing roller 303. For example, the peripheral speed represents the moving distance of a point on the surface of the rotating member per second, and is expressed in units of mm/sec. However, this is just an example, and the definition of the peripheral speed is not limited thereto.

For example, if the ratio of the peripheral speed of the photosensitive drum 304 to that of the developing roller 303 during normal printing is 1:1, extended gamut printing is implemented by setting the ratio to 1:2. For example, the ratio of the peripheral speed of the photosensitive drum 304 to that of the developing roller 303 can be changed from 1:1 (first peripheral speed ratio) to 1:2 (second peripheral speed ratio) by reducing the rotation speed of the photosensitive drum 304 to half that during normal printing. This can prevent toner from being damaged or deteriorated due to an increase in the rotation speed of the developing roller 303. The method for changing the peripheral speed ratio is not limited to reducing the rotation speed of the photosensitive drum 304. Changing the peripheral speed ratio by increasing the rotation speed of the developing roller 303 is not excluded from the present disclosure. In the foregoing example, for the sake of convenience, the peripheral speed ratio during normal printing is described to be 1:1. However, the peripheral speed ratio during normal printing is not limited thereto. For example, the peripheral speed of the developing roller 303 during normal printing may be set higher than that of the photosensitive drum 304, like 5:6.

As described above, extended gamut printing widens the range of colors that can be expressed. Without appropriate print settings, however, extended gamut printing can cause a fixing failure (such as color unevenness and toner separation) or cause the recording medium to get caught around the photosensitive drum 304.

In the present exemplary embodiment, a configuration for allowing execution of extended gamut printing with appropriate print settings (such as sheet size, sheet type, and sheet conveyance speed) will be described.

<Hardware Configuration of Image Forming Apparatus>

A hardware configuration of the image forming apparatus 100 according to the first exemplary embodiment will be described with reference to FIG. 1.

The image forming apparatus 100 includes a central processing unit (CPU) 101, a read-only memory (ROM) 102, a random access memory (RAM) 103, an external storage device 104, a display unit 105, an operation unit 106, an engine interface (I/F) 107, a network I/F 108, and a scanner I/F 109. The image forming apparatus 100 according to the present exemplary embodiment may be of either monochrome type or multicolor type. The image forming apparatus 100 according to the present exemplary embodiment is applicable to electrophotographic image forming apparatuses such as a copying machine, multifunction peripheral (MFP), a laser printer, and a facsimile apparatus. In the first exemplary embodiment, the image forming apparatus 100 will be described by using an MFP having a scan function, a print function, a copy function, and a transmission function as an example. The image forming apparatus 100 will also be described by using an MFP that can form a multicolor image on a recording medium (for example, recording sheet) by using a plurality of colors (cyan, magenta, yellow, and black (CMYK), four colors) of developers (toners) as an example.

The devices in the image forming apparatus 100 are connected to each other via a system bus 110. The image forming apparatus 100 also includes a printer engine 111 and a scanner unit 112. The printer engine 111 and the scanner unit 112 are connected to the system bus 110 via the engine I/F 107 and the scanner I/F 109, respectively.

The CPU 101 controls operation of the entire image forming apparatus 100. The CPU 101 performs various types of processing to be described below by reading programs stored in the ROM 102 into the RAM 103 and executing the programs. The ROM 102 stores a system startup program, a program for controlling the printer engine 111, character data, and character code information. The RAM 103 is a volatile random access memory, and used as a work area of the CPU 101 and a temporary storage area for various types of data. For example, the RAM 103 is used as a storage area for storing font data additionally registered by download and image files received from an external device. The external storage device 104 includes a hard disk, for example. The external storage device 104 spools various types of data, stores programs, information files, and image data, and is used as a work area.

The display unit 105 includes a liquid crystal display (LCD), for example. The display unit 105 is used to display a setting state of the image forming apparatus 100, a status of processing in operation, and an error state.

The operation unit 106 includes input devices such as hardware keys and a touch panel provided on the display unit 105, and accepts inputs (instructions) made by user operations. The operation unit 106 is used to change and reset settings of the image forming apparatus 100, and used to set an operation mode (print mode) of the image forming apparatus 100 in executing image formation (printing).

The engine I/F 107 functions as an I/F for controlling the printer engine 111 based on instructions from the CPU 101 when executing printing. The CPU 101 and the printer engine 111 transmit and receive engine control commands therebetween via the engine I/F 107.

The network I/F 108 functions an I/F for connecting the image forming apparatus 100 to a network 113. Examples of the network 113 may include a local area network (LAN) and the public switched telephone network (PSTN). A personal computer (PC) 114 is connected to the network 113. Printing can be performed by transmitting image data from the PC 114 to the image forming apparatus 100. While the PC 114 is described as a connection destination of the network 113, the connection destination is not limited to the PC 114 and may be an information processing terminal such as a server and a tablet.

The printer engine 111 forms (prints) an image on a recording medium such as paper and based on image data received from the system bus 110 under the control of the CPU 101. The printer engine 111 includes a fixing device 307 (fixing unit) that thermally fixes a toner image transferred onto the recording medium to the recording medium. The fixing device 307 includes a heating unit (heater) for heating the recording medium. The temperature (fixing temperature) of the heater in fixing the image to the recording medium is controlled by the CPU 101. A configuration of the printer engine 111 will be described below with reference to FIG. 3. A sensor 115 detects at least either one of temperature and humidity inside the image forming apparatus 100.

The scanner I/F 109 functions as an I/F for controlling the scanner unit 112 based on instructions from the CPU 101 when the scanner unit 112 reads a document. The CPU 101 and the scanner unit 112 transmit and receive scanner unit control commands therebetween via the scanner I/F 109. Under the control of the CPU 101, the scanner unit 112 reads an image of a document to generate image data, and transmits the image data to the RAM 103 or the external storage device 104 via the scanner I/F 109.

<Configuration of Printer Engine of Image Forming Apparatus>

Figure 3:
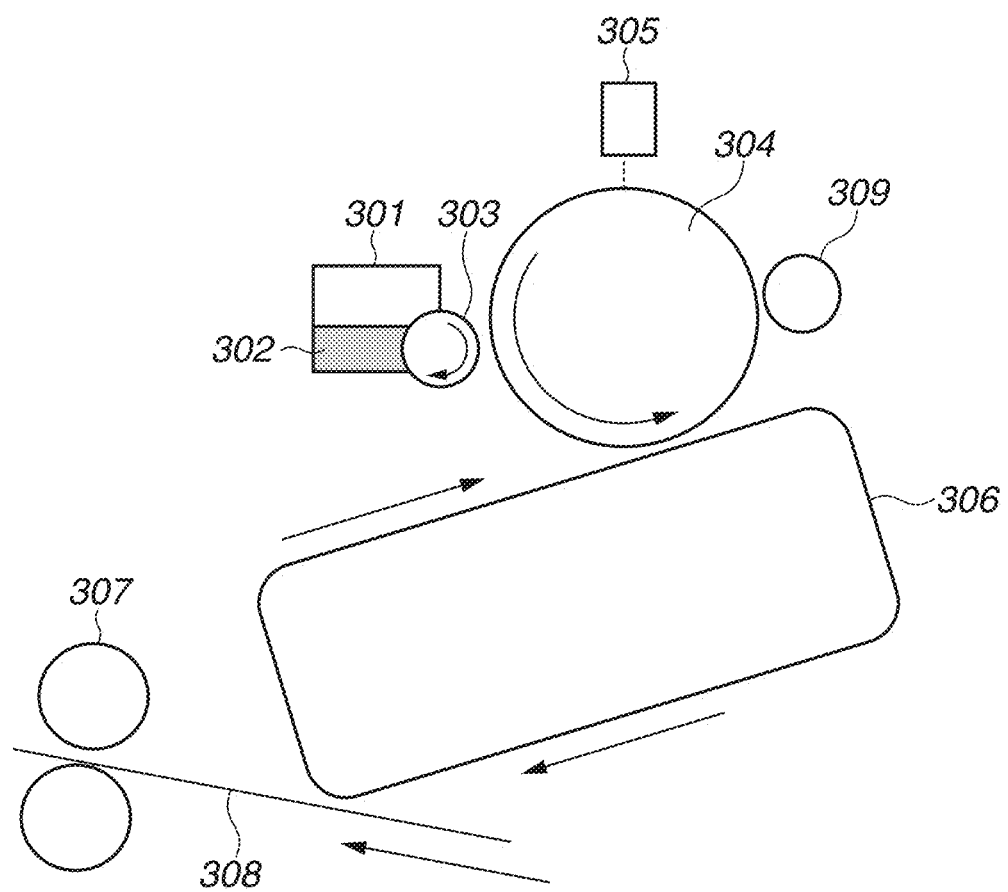
FIG. 3 is a diagram illustrating part of a configuration of a printer engine according to the first exemplary embodiment.

A configuration of the printer engine 111 will be described with reference to FIG. 3. A charging device 309 forms charges on the photosensitive drum 304. An exposure device 305 irradiates the photosensitive drum 304 with laser light to form an electrostatic latent image. The photosensitive drum 304 is an image bearing member that bears an electrostatic latent image. The developing device 301 applies a developer 302 to the developing roller 303 in a thin film form, and develops the electrostatic latent image formed on the photosensitive drum 304. In the present exemplary embodiment, the developer 302 is toner, for example. The developing roller 303 is a developer bearing member that bears the developer 302 for developing the electrostatic latent image formed on the image bearing member. An intermediate transfer member 306 transfers the developed toner image from the photosensitive drum 304 to a recording medium 308. The toner image transferred to the recording medium 308 is fixed to the recording medium 308 by the fixing device 307. The fixing device 307 fixes the image obtained by developing the electrostatic latent image with the developer 302 onto the recording medium 308.

The CPU 101 accepts a setting made by the user from the display unit 105, and controls the respective rotation speeds of the developing roller 303 and the photosensitive drum 304 based on the setting. A typical multicolor printer using CMYK toners include four sets of developing devices 301 and photosensitive drums 304.

For extended gamut printing, the peripheral speed ratio between the developing rollers 303 and the photosensitive drums 304 is increased to increase the amount of toner supply. The irradiation intensity of the laser light is also increased to promote adhesion of toner to the photosensitive drums 304. The amounts of toner applied to the photosensitive drums 304 are increased by these two controls, whereby more toner is transferred to the recording sheet for higher saturation.

<Functional Configuration of Image Forming Apparatus>

Figure 2:
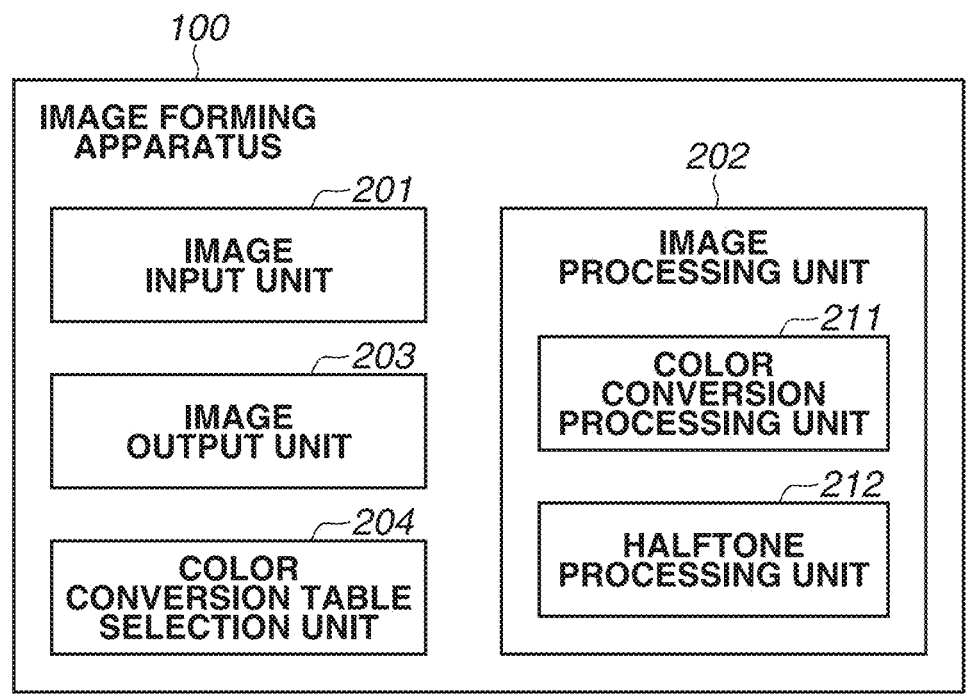
FIG. 2 is a diagram illustrating a functional configuration of the image forming apparatus according to the first exemplary embodiment.

FIG. 2 is a block diagram illustrating a functional configuration of the image forming apparatus 100 according to the first exemplary embodiment. The image forming apparatus 100 includes an image input unit 201, an image processing unit 202, an image output unit 203, and a color conversion table selection unit 204 as its functional components. Such functional units are each implemented on the image forming apparatus 100 by the CPU 101 reading a program stored in the ROM 102 into the RAM 103 and executing the program.

The image input unit 201 accepts input of image data to the image forming apparatus 100. An example of the image data to be input is a bitmap image. The image input unit 201 stores the image data accepted as an input into the RAM 103 or the external storage device 104.

The color conversion table selection unit 204 selects one of a plurality of color conversion tables based on the ratio of the rotation speed of the developing rollers 303 to that of the photosensitive drums 304 (peripheral speed ratio) to be described below. In the present exemplary embodiment, a color conversion table is a three-dimensional lookup table (LUT) with red-green-blue (RGB) data as an input and with CMYK data as an output.

The peripheral speed ratio between the developing rollers 303 and the photosensitive drums 304 changes depending on the setting accepted from the user. For example, if the user selects extended gamut printing as a print setting, image formation processing is performed at a peripheral speed ratio higher than in normal printing. The color conversion table selection unit 204 selects a color conversion table corresponding to the peripheral speed ratio, whereby color conversion factors based on the amount of toner can be applied for appropriate color control.

If the amounts of toner supply to the photosensitive drums 304 are changed to change the color reproduction range by changing the ratio of the rotation speed of the developing rollers 303 to that of the photosensitive drums 304 (peripheral speed ratio), the entire output image including low density portions varies in density. This can change colors that are not supposed to change. Different color conversion tables are then applied for color conversion at respectively different peripheral speed ratios so that colors not supposed to change can be output in constant colors even when printed at different peripheral speed ratios. For example, the image forming apparatus 100 performs color conversion processing by using a color conversion table for extended gamut printing, which is associated with extended gamut printing in which printing is executed with the peripheral speed ratio between the rotation speeds of the photosensitive drums 304 and the developing rollers 303 at 1:3. Color conversion processing suitable for deep-colored images can be performed by the color conversion table selection unit 204 selecting a color conversion LUT suited to the extended gamut printing.

The image processing unit 202 performs image processing, such as color conversion processing and halftone processing, on the input image data. The image processing unit 202 converts the input image data into image data (print data) corresponding to an image that can be output (printed on a recording medium) by the image output unit 203. In other words, the image processing unit 202 generates print data from the input image data.

The image output unit 203 receives the print data generated by the image processing unit 202, and transmits the print data as a video signal to the printer engine 111 via the engine I/F 107. The CPU 101 thereby controls the printer engine 111 to form an image on a recording medium based on the print data generated by the image processing unit 202. The printer engine 111 prints the image on the recording medium by performing exposure, development, transfer, and fixing processes.

<Image Processing in Image Processing Unit>

The image processing unit 202 includes a color conversion processing unit 211 and a halftone processing unit 212. The color conversion processing unit 211 converts the input image data into data suited to the printer engine 111 by using the three-dimensional LUT selected by the color conversion table selection unit 204. For example, if the input image data is RGB data and the image forming apparatus 100 is a multicolor printer using CMYK toners, the color conversion processing unit 211 applies processing for converting RGB data into CMYK data to the input image data.

The halftone processing unit 212 applies halftone processing to the CMYK data converted by the color conversion processing unit 211. The printer engine 111 often supports output with only a small number of gradations, such as two, four, and 16 gradations. The halftone processing unit 212 then performs the halftone processing so that a stable halftone representation can be output even with the small number of gradations. Various methods can be applied to the halftone processing by the halftone processing unit 212. Examples include a density pattern method, a systematic dither method, and an error diffusion method. In extended gamut printing, halftone processing can include processing different from normal halftone processing. For example, dither processing is performed with fewer lines or different dither shapes than in normal printing. The purpose is to prevent the occurrence of color unevenness due to the execution of extended gamut printing. The image processing is also performed by setting the upper limit value in the amount of applied toner of the image data higher than in normal printing. The processing for generating image data for extended gamut printing is not limited to the foregoing. Gamma correction processing and image distortion corrections different from processing performed during normal printing may be performed.

<Settings and Image Data on PC>

FIG. 4 illustrates an example of a setting UI for image data on the PC 114. Possible settings include sheet size, sheet type, one-sided/two-sided, number of copies, color mode, and output type settings. The one-sided/two-sided setting is a setting about whether to draw an image on one side of the recording medium or draw images on both sides of the recording medium. The output type setting is a setting about whether to execute printing at an increased peripheral speed ratio. In the present exemplary embodiment, either one of "normal" and "extended gamut" can be selected as the output type. If "extended gamut" is selected, the ratio of the rotation speed of the developing roller 303 to that of the photosensitive drum 304 becomes higher than if "normal" is selected.

As will be described below, in the present exemplary embodiment, restrictions are imposed on the sheet size, sheet type, and one-sided/two-sided settings if "extended gamut" is set as the output type. To notify the user that the settings are restricted and of the reason therefor, an exclusive control or alert popup may be displayed on the UI.

Figure 5:
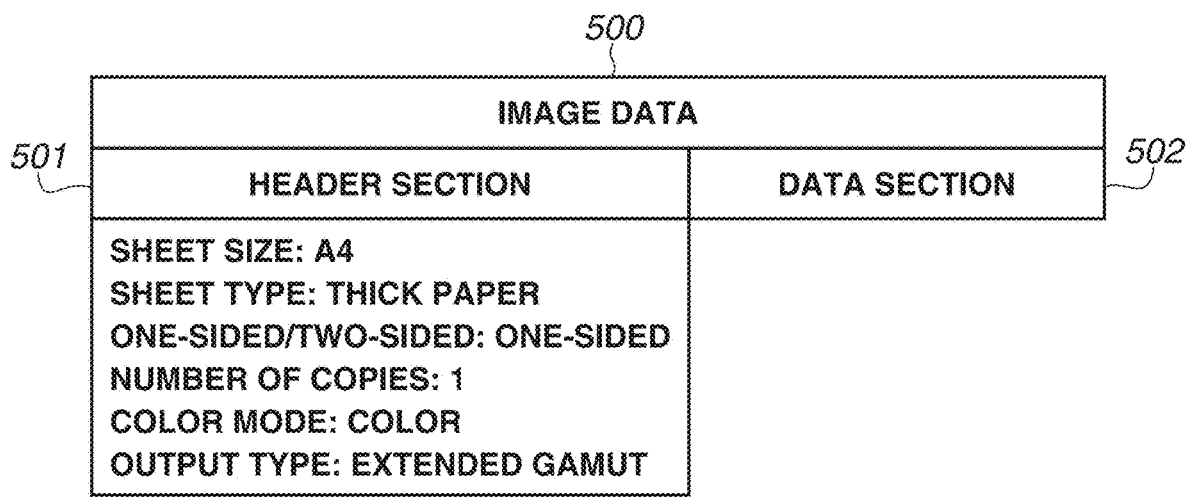
FIG. 5 illustrates an example of a data structure of image data according to the first exemplary embodiment.

FIG. 5 illustrates an example of image data generated by the PC 114 based on the settings of FIG. 4. Image data 500 include a header section 501 and a data section 502. The header section 501 contains the setting values set via the UI of FIG. 4. The data section 502 contains print data. The print data is expressed in a page description language (PDL), Tagged Image File Format (TIFF), or Joint Photographic Experts Group (JPEG) format.

The image forming apparatus 100 interprets the contents described in the header section 501 of the image data 500 to obtain the print settings. The setting items illustrated in FIG. 4 are merely examples, and settings of other setting items may be obtained. Some of the setting items illustrated in FIG. 4 may be not obtained.

In such a manner, the image forming apparatus 100 obtains the print setting(s) of at least either one of the size of the recording medium used for printing and the type of recording medium. The image forming apparatus 100 can also accept designation of the printing method to be executed among a plurality of printing methods including normal printing (first printing method) and extended gamut printing (second printing method). The CPU 101 functions as an acceptance unit for accepting the designation of the printing method. As described above, the second printing method refers to a printing method to draw an image having a density that is higher than a density of an image printable by the first printing method.

The PC 114 may obtain information indicating that "automatic" is set as the sheet size, and the image forming apparatus 100 may obtain a determined sheet size. The setting items illustrated in FIG. 4 may be set and obtained by the image forming apparatus 100.

For example, if the header section 501 is set to "based on device settings" (or the header section 501 is blank), settings made by the image forming apparatus 100 may be used.

<Settings by Image Forming Apparatus>

Figure 6:
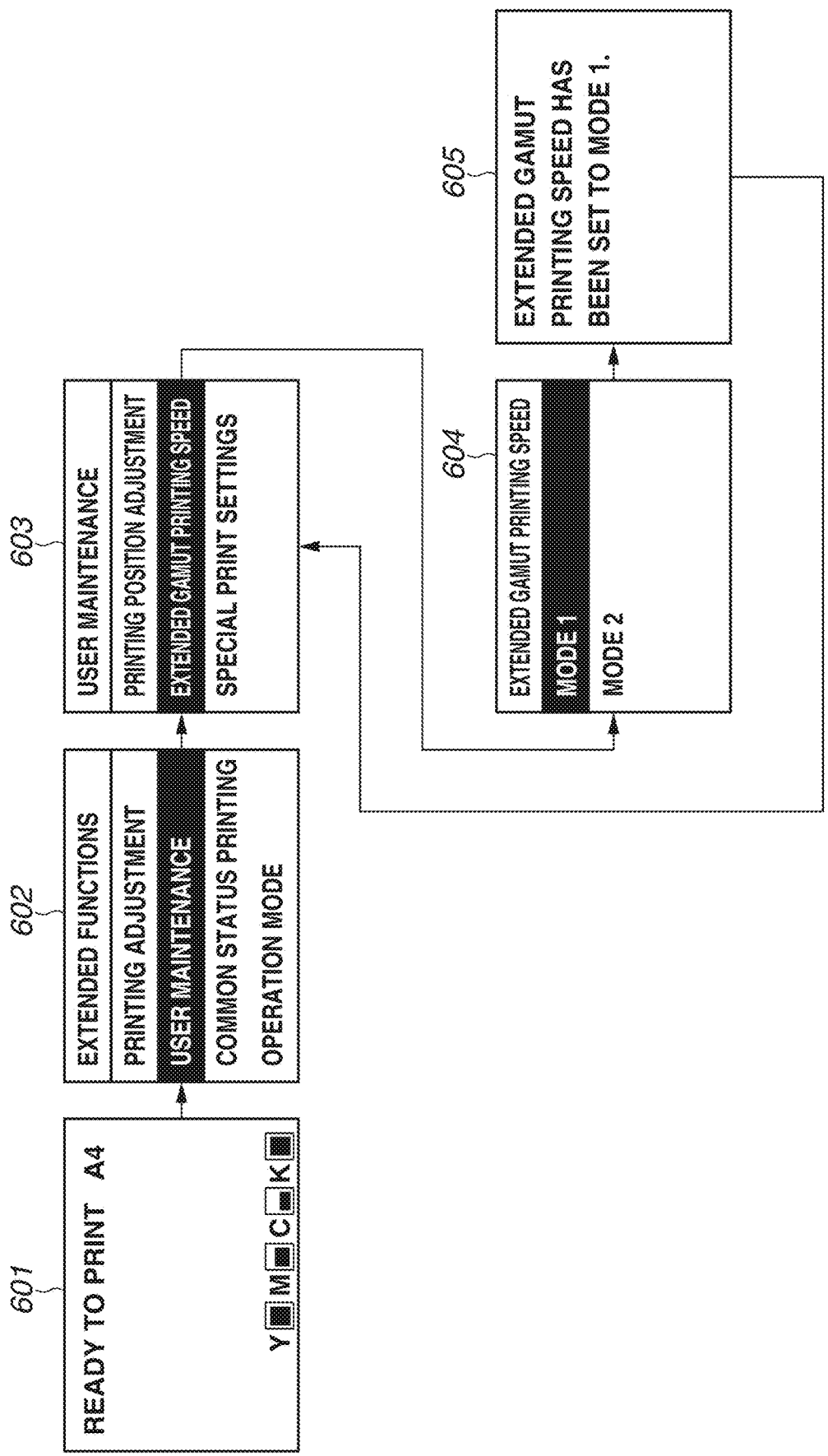
FIG. 6 illustrates an example of a UI for making a setting according to the first exemplary embodiment.

FIG. 6 illustrates an example of a screen for the user to make a setting about extended gamut printing, displayed on the display unit 105. When the image forming apparatus 100 is activated, the display unit 105 displays a job standby screen 601. If the operation unit 106 detects input in such a state, the screen displayed on the display unit 105 transitions to an extended functions screen 602.

If the operation unit 106 detects that "user maintenance" is selected, the screen displayed on the display unit 105 transitions from the extended functions screen 602 to a user maintenance screen 603.

If the operation unit 106 then detects that "extended gamut printing speed" is selected, the screen displayed on the display unit 105 transitions from the user maintenance screen 603 to an extended gamut printing speed screen 604. Here, a screen for selecting either one of modes 1 and 2 is displayed. If the operation unit 106 detects that "mode 1" is selected, a screen 605 indicating that mode 1 is set is displayed. The screen 605 then transitions to the user maintenance screen 603. The screen transition here may be automatically performed after a lapse of a certain time. The screen transition may be performed in response to detection of a screen transition instruction by the operation unit 106. The screen may transition to a screen other than the user maintenance screen 603. Modes 1 and 2 correspond to conveyance speeds of the recording medium in performing extended gamut printing. Mode 1 is a mode in which extended gamut printing is performed at ½ speed. Mode 2 is a mode in which extended gamut printing is performed at ⅓ speed. Modes 1 and 2 can be selected based on the sheet type. As employed herein, ½ speed and ⅓ speed represent the conveyance speeds of the recording medium. These speeds represent the conveyance speeds if the normal conveyance speed in performing normal printing by using plain paper is 1. That is, ½ speed is slower than the normal conveyance speed, and ⅓ speed is even slower than ½ speed. In such a manner, the image forming apparatus 100 obtains the print setting about the conveyance speed of the recording medium.

Reducing the conveyance speed increases the time for the recording medium to pass through the fixing device 307, and increases the heat supplied to the recording medium. For example, if a large amount of toner is applied to the recording medium, the toner can be reliably fixed to the recording medium by reducing the conveyance speed. The peripheral speed ratio between the photosensitive drum 304 and the developing roller 303 is maintained even if the conveyance speed is changed. In other words, if printing is executed with the extended gamut setting, the printing is executed at the peripheral speed ratio for extended gamut printing regardless of the conveyance speed.

In such a manner, the CPU 101 of the image forming apparatus 100 determines a printing method to be executed among a plurality of printing methods including normal printing and extended gamut printing. The present exemplary embodiment deals with the case where the image forming apparatus 100 can execute normal printing and extended gamut printing as its printing methods. However, the image forming apparatus 100 may be configured to perform print processing by other printing methods.

In the present exemplary embodiment, if normal printing is selected as the output type on the PC 114 via the UI illustrated in FIG. 4, image data including an instruction to execute normal processing is transmitted to the image forming apparatus 100. If image data including an instruction to execute normal printing is obtained and the print settings other than the output type include settings that allow normal printing as will be described below, the CPU 101 determines normal printing to be the printing method to be performed.

If extended gamut printing is selected as the output type on the PC 114, image data including an instruction to execute extended gamut printing is transmitted to the image forming apparatus 100. If image data including an instruction to execute extended gamut printing is obtained and the print settings other than the output type include settings that allow extended gamut printing as will be described below, the CPU 101 determines extended gamut printing to be the printing method to be performed.

In the present exemplary embodiment, the instruction about the printing method is described to be included in the image data. However, this is not restrictive. The instruction for designating the printing method may be transmitted from the PC 114 to the image forming apparatus 100 separately from the image data. The operation unit 106 of the image forming apparatus 100 may accept the instruction for designating the printing method.

<Execution Environment of Extended Gamut Printing>

Figure 7:
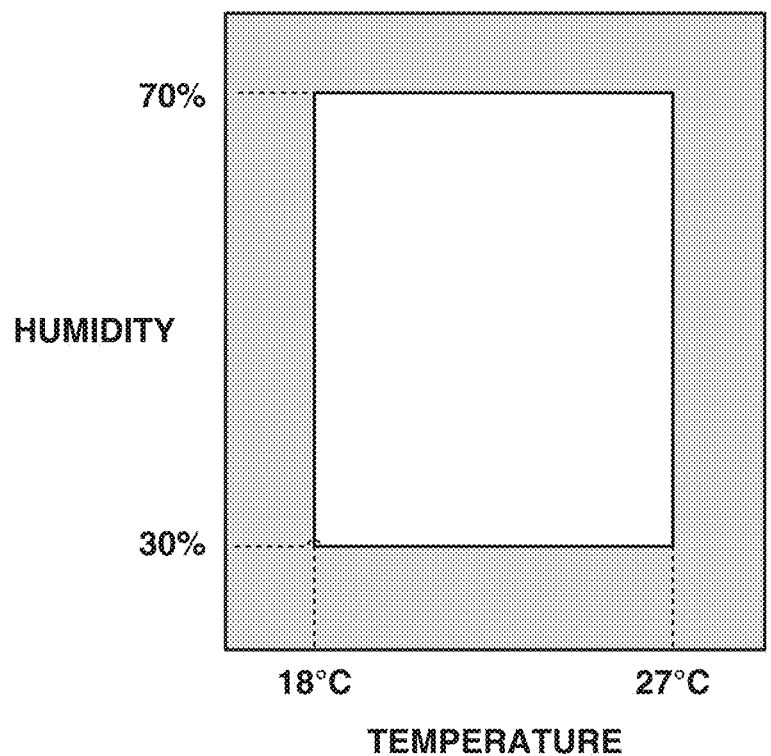
FIG. 7 is a chart illustrating an environment in which extended gamut printing can be executed according to the first exemplary embodiment.

FIG. 7 illustrates an environment in which extended gamut printing can be executed. In the present exemplary embodiment, the sensor 115 of the printer engine 111 can measure (detect) temperature and humidity. Whether extended gamut printing can be executed is determined based on the detection result. The white area in FIG. 7 represents an area where extended gamut printing can be executed. The gray area represents an area where extended gamut printing is not executable (not permitted).

If the temperature and/or humidity is/are low, sufficient fixing temperature may not be provided. On the other hand, if the temperature and/or humidity is/are high, the high temperature of the fixing device 307 can cause the recording sheet to deform (for example, curl). Whether extended gamut printing can be executed therefore needs to be determined based on the environment.

<Sheet Types for Extended Gamut Printing>

FIG. 8 is a table illustrating combinations of types of recording media and conveyance speeds of the recording media to permit the execution of printing by extended gamut printing. The information illustrated in FIG. 8 is stored in the external storage device 104 or the ROM 102. As will be described below with reference to FIGS. 10A and 10B of FIG. 10, the CPU 101 determines whether to permit the execution of extended gamut printing based on the information illustrated in the table of FIG. 8.

In extended gamut printing, the temperature of the fixing device 307 needs to be ensured since more toner is used. Insufficient fixing temperature can cause a fixing failure. On the other hand, if the temperature of the fixing device 307 is too high, excessive melting of the toner deteriorates separability between the recording medium (recording sheet) and the fixing device 307, and the recording medium can get caught around the fixing device 307.

If the recording medium has a thickness (grammage) less than or equal to a first threshold, the recording medium absorbs less heat and the temperature of the fixing device 307 tends to be high. If the temperature of the fixing device 307 is raised to execute extended gamut printing, excessive melting of the toner can cause the recording medium to get caught around the fixing device 307 as described above. The execution of extended gamut printing is therefore restricted if the grammage of the recording medium is less than or equal to the first threshold. For example, if the grammage of the recording medium is less than or equal to the first threshold, the execution of extended gamut printing is prohibited.

If the temperature of the fixing device 307 is unable to be ensured and becomes low, insufficient melting of the toner can cause an image defect or a phenomenon in which the toner separates from the recording medium. If the recording medium has a thickness (grammage) greater than or equal to a second threshold, the recording medium absorbs more heat and the temperature of the fixing device 307 tends to be low. Here, the second threshold is greater than the first threshold. In other words, the second threshold corresponds to the thickness of a recording medium greater than the first threshold. If extended gamut printing is executed with the grammage of the recording medium greater than or equal to the second threshold, the heat for fixing the toner is unable to be ensured and there can occur an image failure or toner separation. The execution of extended gamut printing is therefore also restricted if the grammage of the recording medium is greater than or equal to the second threshold. For example, if the grammage of the recording medium is greater than or equal to the second threshold, the execution of extended gamut printing is prohibited.

FIG. 8 illustrates the thicknesses (grammages) of recording media and the executability of extended gamut printing. FIG. 8 illustrates that extended gamut printing is not executable (not permitted) for thin paper having a thickness (grammage) less than or equal to the first threshold and thick paper 3 having a thickness (grammage) greater than or equal to the second threshold. FIG. 8 also illustrates that in the present exemplary embodiment, extended gamut printing at ½ speed and ⅓ speed can be executed in printing using plain paper and thick paper 1. As described above, ½ speed and ⅓ speed represent the conveyance speeds of the recording medium.

<Sheet Sizes for Extended Gamut Printing>

Figure 9A:
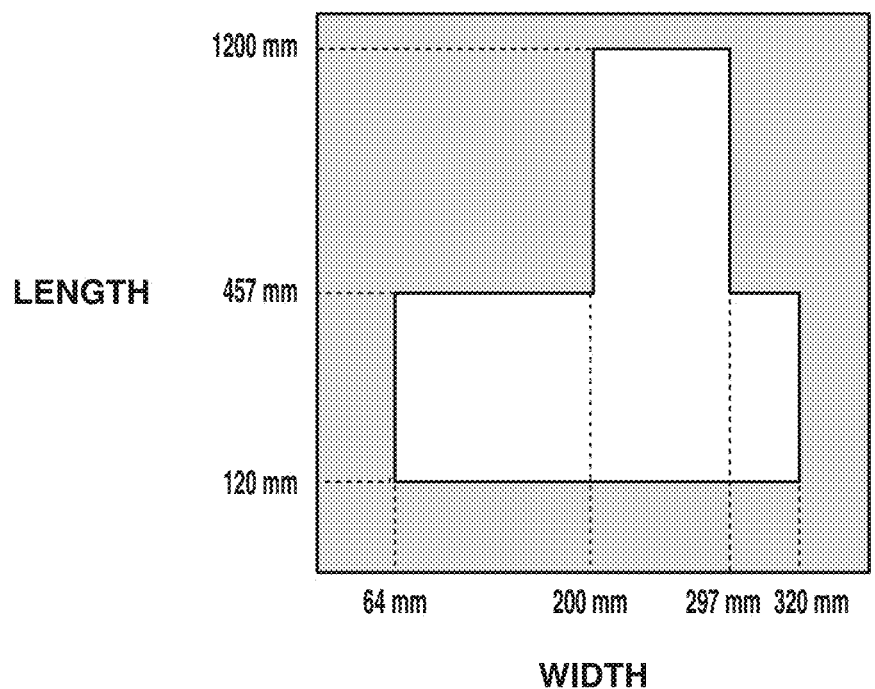
FIGS. 9A and 9B are charts illustrating sheet sizes and the executability of normal printing and extended gamut printing according to the first exemplary embodiment.
Figure 9B:
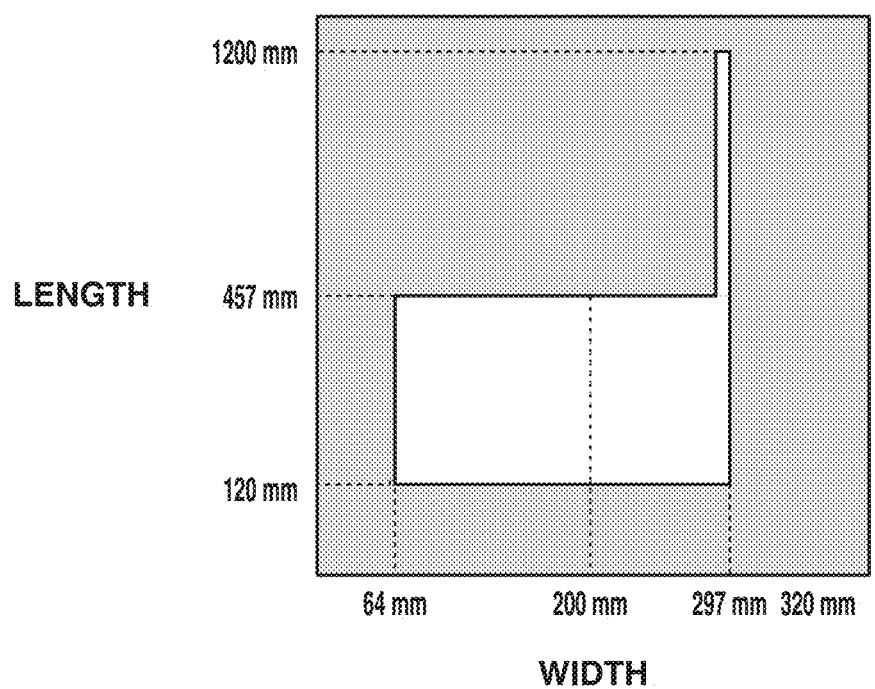

FIGS. 9A and 9B are charts illustrating sheet sizes and the executability of normal printing and extended gamut printing. The information illustrated in FIGS. 9A and 9B is stored in the external storage device 104 or the ROM 102. FIG. 9A illustrates the executability of normal printing. FIG. 9B illustrates the executability of extended gamut printing. The information illustrated in FIG. 9A is second size information indicating the range of sizes of recording media that permits the execution of printing by normal printing. The information illustrated in FIG. 9B is first size information indicating the range of sizes of recording media that permits the execution of printing by extended gamut printing. The white areas represent the ranges where the execution of printing is permitted. The gray areas represent the ranges where the execution of printing is not permitted. As illustrated in FIGS. 9A and 9B, the range of sizes of recording media that permits the execution of printing by normal printing is different from the range of sizes of recording media that permits the execution of printing by extended gamut printing.

The CPU 101 of the image forming apparatus 100 determines whether to permit the execution of extended gamut printing based on the information illustrated in FIG. 9B.

In FIGS. 9A and 9B, the vertical axis indicates the length of a recording medium in a direction along the conveyance direction (direction parallel to the conveyance direction) (hereinafter, referred to as "length"). The horizontal axis indicates the length of the recording medium in a direction orthogonal to the conveyance direction (hereinafter, referred to as "width"). If the proportion of the length to the width of the recording medium is greater than or equal to a certain level, a phenomenon in which the end portions of the fixing device 307 become too high in temperature (end portion temperature increase) occurs. The end portion temperature increase is a phenomenon in which the heat of the portion of the fixing device 307 where the recording medium passes is consumed by the recording medium while the end portions of the fixing device 307 where the recording medium does not pass accumulate heat and increase in temperature. In the case of extended gamut printing, the temperature of the fixing device 307 needs to be raised and the impact of the end portion temperature increase is high. This narrows the executable range, compared to normal printing.

If the width is greater than or equal to a predetermined level, the temperature at the end portions of the fixing device 307 becomes difficult to ensure and the executable range becomes narrow. One of the reasons is that the recording medium is likely to lose heat at end portions thereof and the temperature is likely to decrease. In extended gamut printing, in particular, the greater amount of applied toner than usual needs higher temperature than during normal printing. If the temperature is difficult to be ensured, insufficient fixing of the toner can cause an image defect or toner separation.

<Setting Control in Extended Gamut Printing>

Figure 10B:
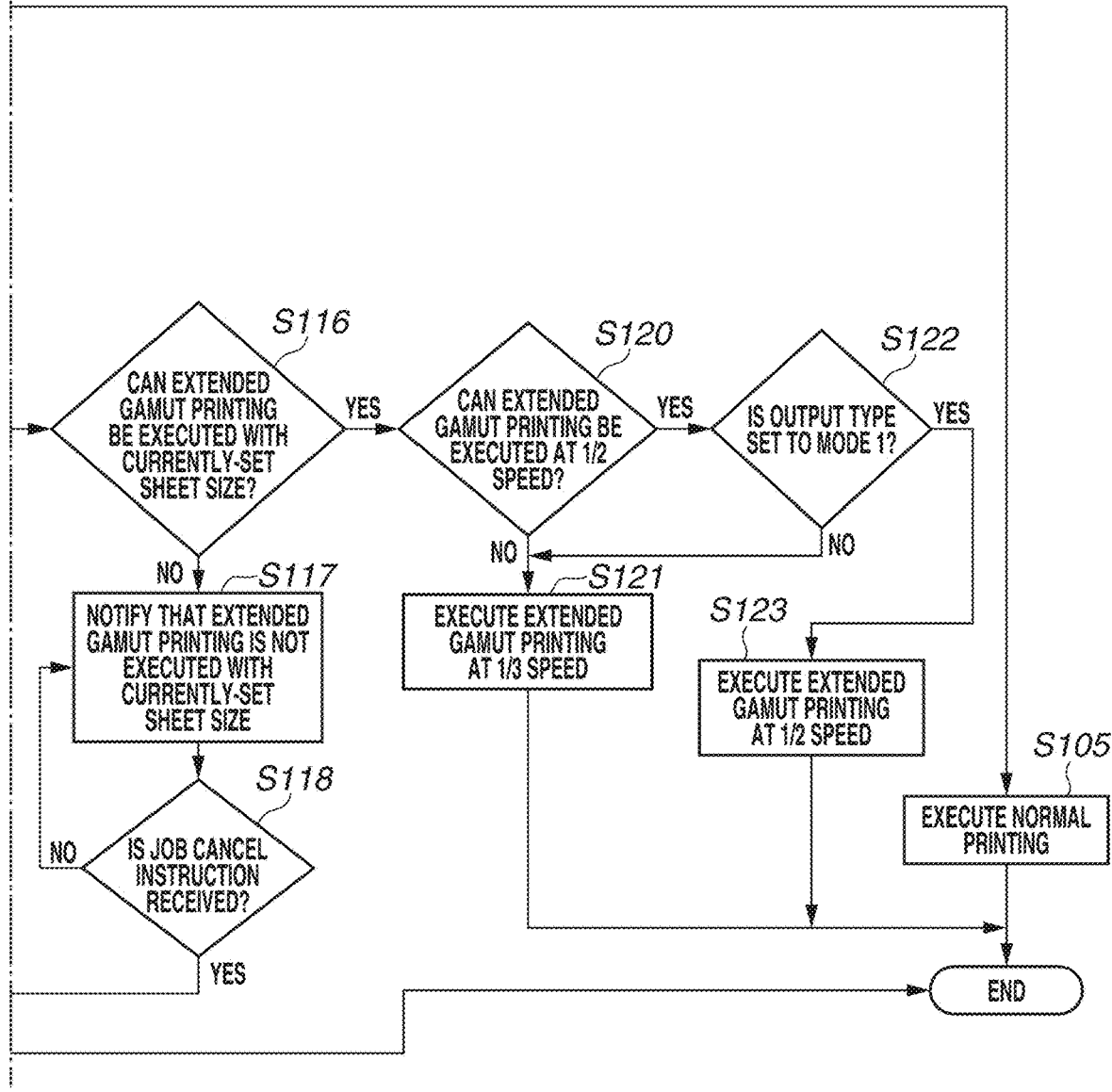
FIG. 10 includes FIGS. 10A and 10B, which are flowcharts illustrating a procedure from reception of image data to printing according to the first exemplary embodiment.

Determination processing for determining whether to permit the execution of printing by extended gamut printing based on other print settings if extended gamut printing is designated as the printing method to be executed will be described with reference to the flowcharts of FIGS. 10A and 10B. The steps in FIGS. 10A and 10B are implemented on the image forming apparatus 100 by the CPU 101 reading a program stored in the ROM 102 into the RAM 103 and executing the program. Part of the flowchart may be configured to be performed by the PC 114.

In step S101, the image input unit 201 waits for input of image data. If input image data is accepted (YES in step S101), the processing proceeds to step S102.

In step S102, the CPU 101 analyzes the header section of the received image data. As a result of analysis of the header section, the CPU 101 obtains information about the output type ("normal" or "extended gamut"), one-sided/two-sided setting, sheet type, and sheet size. If any of the pieces of information is not set, a setting having a predetermined fixed value is used to continue processing. The fixed value may be freely set by the user operating the image forming apparatus 100. Alternatively, if there is a piece of information that is not set, the processing may be aborted and the missing of information about the image data may be notified.

In step S103, the CPU 101 determines whether the setting of the output type obtained in step S102 is "normal" or "extended gamut". If the output type is "normal" (NO in step S103), the processing proceeds to step S104. If the output type is "extended gamut" (YES in step S103), the processing proceeds to step S106.

In step S104, i.e., if the output type is "normal", the color conversion table selection unit 204 selects a color conversion table for normal printing. The image processing unit 202 then performs image processing by using the selected color conversion table. In step S105, the image processing unit 202 performs print control for normal printing.

In step S106, i.e., if the output type is "extended gamut", the color conversion table selection unit 204 selects a color conversion table for extended gamut printing. The image processing unit 202 then performs image processing by using the selected color conversion table. The processing proceeds to step S107.

In step S107, the CPU 101 determines whether extended gamut printing can be executed based on the information about the temperature and humidity obtained by the sensor 115 and the executable environment chart of extended gamut printing illustrated in FIG. 7. If extended gamut printing is unable to be executed (execution is not permitted) (NO in step S107), the processing proceeds to step S108. If extended gamut printing can be executed (YES in step S107), the processing proceeds to step S110.

In step S108, the CPU 101 displays a message that extended gamut printing is unable to be executed on the display unit 105 as illustrated in FIG. 11A. In step S109, the CPU 101 enters a state of waiting for a job cancel instruction. The display of FIG. 11A provides a notification that printing by extended gamut printing is not executed at the current temperature or humidity.

In step S109, if a job cancel instruction is received from the operation unit 106 or the PC 114 (YES in step S109), the processing proceeds to S119. In step S119, the CPU 101 cancels the job. The present flowchart ends.

Next, the processing to be executed in the case where extended gamut printing is determined to be executable in step S107 will be described. In step S110, the CPU 101 determines whether one-sided printing is set based on the one-sided/two-sided setting obtained in step S102. If one-sided printing is not set (two-sided printing is set) (NO in step S110), the processing proceeds to step S111. If one-sided printing is set (YES in step S110), the processing proceeds to step S113.

In step S111, the display unit 105 displays a message that extended gamut printing and two-sided printing are unable to be designated at the same time as illustrated in FIG. 11B. The display of FIG. 11B provides a notification that printing by extended gamut printing is not executed if two-sided printing is set. In step S112, like step S109, the CPU 101 waits for a job cancel instruction. If a job cancel instruction is given (YES in step S112), the processing proceeds to step S119. In step S119, the CPU 101 cancels the job.

In step S113, the CPU 101 determines whether extended gamut printing can be executed based on the information about the sheet type obtained in step S102 and the table of FIG. 8. If extended gamut printing is determined to be not executable (not permitted) (NO in step S113), the processing proceeds to step S114. If extended gamut printing is determined to be executable (YES in step S113), the processing proceeds to step S116.

In step S114, the display unit 105 displays a message that sheets of the currently-set sheet type are not usable for extended gamut printing as illustrated in FIG. 11C. The display of FIG. 11C provides a notification that printing by extended gamut printing is not executed with the currently-set sheet type.

In step S115, like step S109, the CPU 101 waits for a job cancel instruction. If a job cancel instruction is given (YES in step S115), the processing proceeds to step S119. In step S119, the CPU 101 cancels the job.

In step S116, the CPU 101 determines whether extended gamut printing can be executed from the information about the sheet size obtained in step S102 and the chart of FIG. 9B. If extended gamut printing is determined to be not executable (not permitted) (NO in step S116), the processing proceeds to step S117. If extended gamut printing is determined to be executable (YES in step S116), the processing proceeds to step S120.

In step S117, the display unit 105 displays a message that sheets of the currently-set sheet size are not usable for extended gamut printing as illustrated in FIG. 11D. The display of FIG. 11D provides a notification that printing by extended gamut printing is not executed with the currently-set sheet size.

In step S118, like step S109, the CPU 101 waits for a job cancel instruction. If a job cancel instruction is given (YES in step S118), the processing proceeds to step S119. In step S119, the CPU 101 cancels the job.

In step S120, the CPU 101 determines whether extended gamut printing can be executed at ½ speed based on the information about the sheet type obtained in step S102 and the table of FIG. 8. If extended gamut printing is determined to be not executable at ½ speed (i.e., extended gamut printing can only be executed at ⅓ speed) (NO in step S120), the processing proceeds to step S121. In step S121, the CPU 101 executes extended gamut printing at ⅓ speed. If extended gamut printing is determined to be executable at ½ speed (YES in step S120), the processing proceeds to step S122.

In step S122, the CPU 101 determines whether to execute extended gamut printing at ½ speed or at ⅓ speed based on the setting made via the setting screen illustrated in FIG. 6. If the output type is set to mode 1, the CPU 101 determines to execute extended gamut printing at ½ speed (YES in step S122), and the processing proceeds to step S123. In step S123, the CPU 101 executes extended gamut printing at ½ speed. If the output type is set to mode 2, the CPU 101 determines to execute extended gamut printing at ⅓ speed (NO in step S122), and the processing proceeds to step S121. In step S121, the CPU 101 executes extended gamut printing at ⅓ speed.

As described above, whether to execute extended gamut printing can be determined based on at least any one of the print settings including environment information such as temperature and humidity, the one-sided/two-sided setting, the sheet type, and the sheet size. This can prevent the recording medium from getting caught around the fixing device 307 and prevent the occurrence of an image defect or toner separation due to the execution of extended gamut printing. Extended gamut printing can thus be executed with appropriate print settings.

In the foregoing example, the environment information such as temperature and humidity, the one-sided/two-sided setting, the sheet type, and the sheet size are described to be all checked. However, this is not restrictive. Whether extended gamut printing can be executed may be determined by taking into account only some of the print settings. Alternatively, whether extended gamut printing can be executed may be determined by taking into account other information in addition to the pieces of information. The checking order is not limited to the foregoing, either. Similar effects can be obtained by checking the print settings in different order. In the present exemplary embodiment, if extended gamut printing is determined to not be permitted, the CPU 101 waits for a job cancel instruction. However, this is not restrictive. Printing may be continued by changing the output type from extended gamut to normal. Printing may be continued by replacing the one-sided/two-sided, sheet type, and sheet size settings with ones that allows extended gamut printing to be performed.

A second exemplary embodiment will be described below. In the method of the first exemplary embodiment, the occurrence of a fixing failure at the ends of the recording sheet is described to be prevented by restricting the execution of extended gamut printing if the width of the recording medium (recording sheet) is determined to be greater than or equal to a threshold. For example, in the example of FIG. 9B, the execution of extended gamut printing is restricted if the width is greater than 297 mm.

Such an approach, however, can lower user convenience since the execution of extended gamut printing is discontinued even in situations where a fixing failure is not likely to occur and the execution of extended gamut printing does not need to be restricted.

For example, in the first exemplary embodiment, if the recording medium has a width greater than or equal to the threshold, the execution of extended gamut printing is restricted because temperature sufficient to fix the toner is difficult to be ensured. However, a fixing failure will not occur if no image including a high-density object is drawn at the ends of the recording medium.

In the present exemplary embodiment, an example where the execution of extended gamut printing is permitted although the recording medium has a width greater than or equal to a threshold, provided that no image is drawn at the ends of the recording medium or the amount of applied toner is less than or equal to a threshold, will be described.

An image forming apparatus 100 according to the present exemplary embodiment has a similar hardware configuration to that described in the first exemplary embodiment. A description thereof will thus be omitted.

Figure 12:
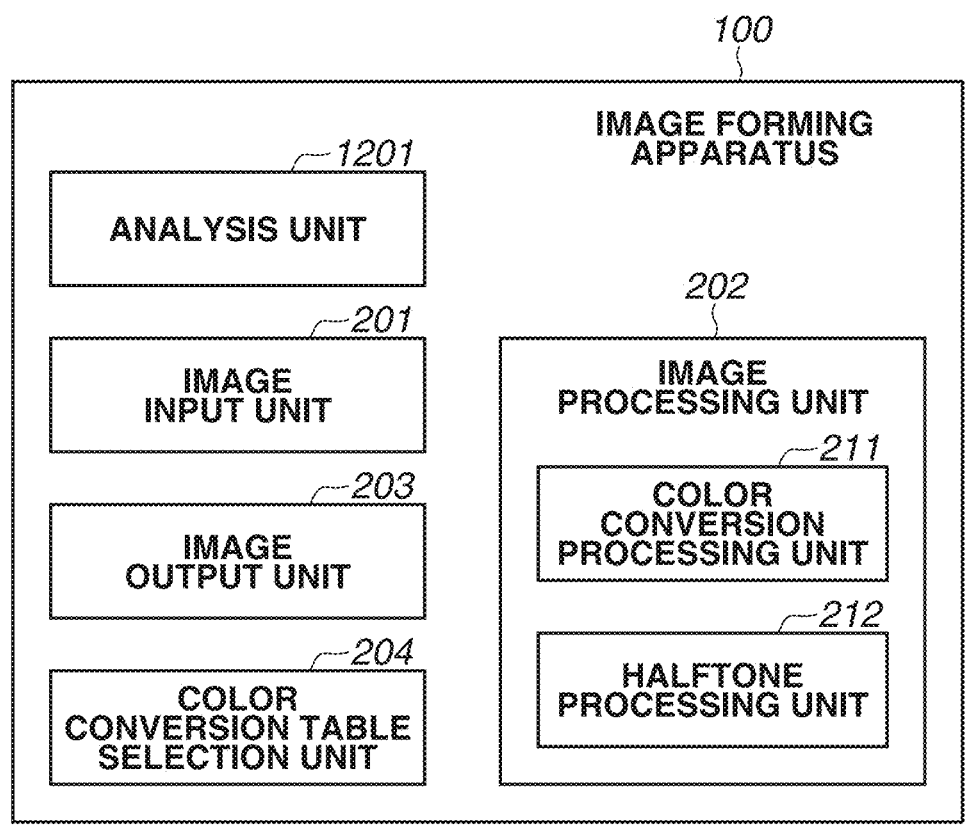
FIG. 12 is a diagram illustrating a functional configuration of an image forming apparatus according to a second exemplary embodiment.

FIG. 12 illustrates a software configuration of the image forming apparatus 100 according to the present exemplary embodiment. A difference from the first exemplary embodiment is that an analysis unit 1201 is included. In other respects, the software configuration is the same as described in the first exemplary embodiment. The analysis unit 1201 identifies the amount of toner applied to the recording medium. The analysis unit 1201 derives the maximum amount of toner and the average amount of toner applied to end areas. In the present exemplary embodiment, the analysis unit 1201 is described to be configured by software.

However, this is not restrictive. The analysis unit 1201 may be configured by hardware such as a circuit.

The image forming apparatus 100 according to the present exemplary embodiment performs similar processing to that described in the first exemplary embodiment with reference to FIGS. 10A and 10B. A difference from the first exemplary embodiment is that the determination of step S116 is made by taking into account the width of the image drawn on the recording medium and the amount of applied toner.

<Processing for Determining Sheet Size, Image Size, and Amount of Applied Toner>

Figure 13:
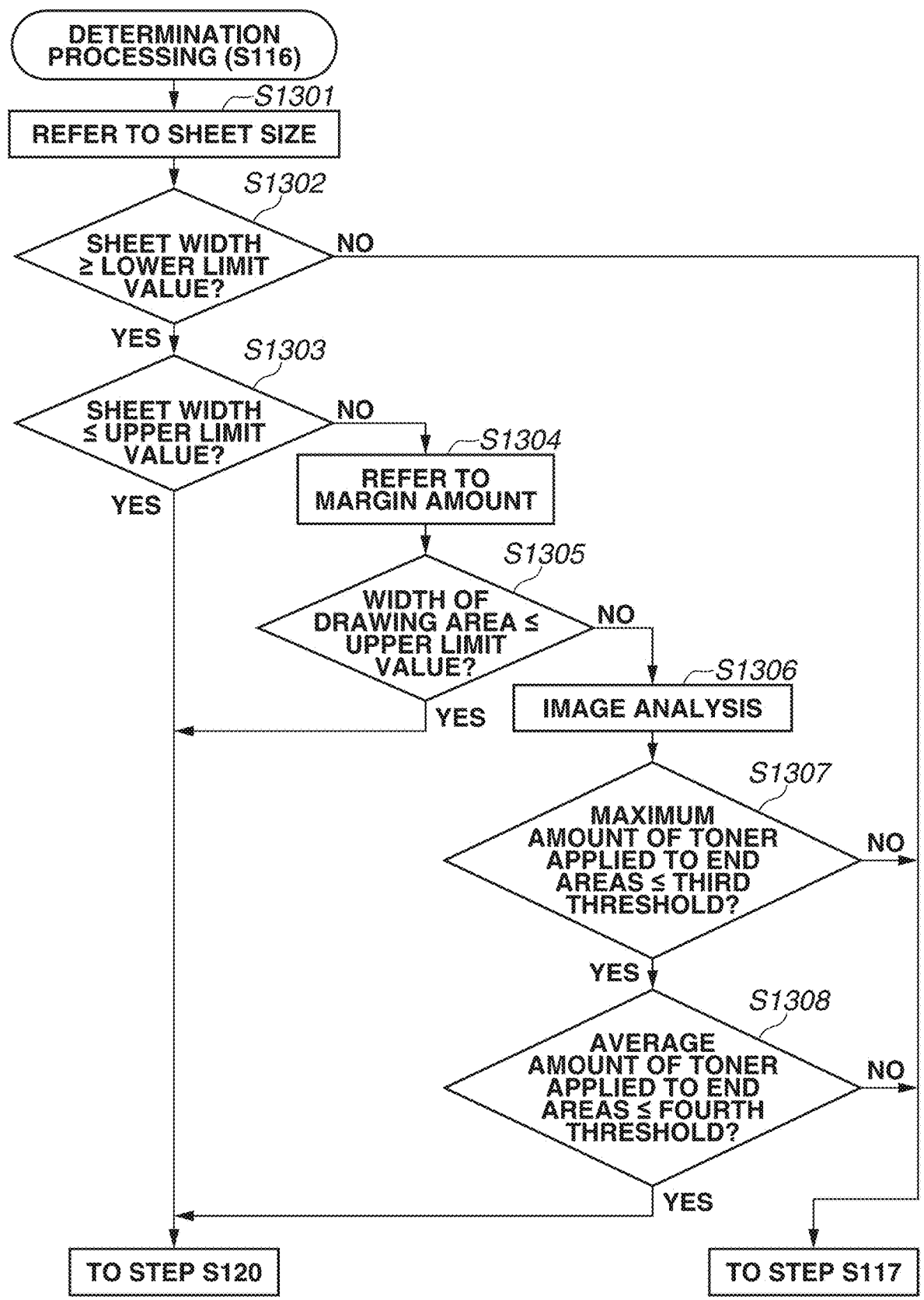
FIG. 13 is a flowchart illustrating processing for determining whether extended gamut printing can be executed according to the second exemplary embodiment.

Details of the determination processing in step S116 according to the present exemplary embodiment will be described with reference to FIG. 13. The steps in FIG. 13 are implemented on the image forming apparatus 100 by the CPU 101 reading a program stored in the ROM 102 into the RAM 103 and executing the program. Part of the flowchart may be performed by the PC 114.

In step S1301, the CPU 101 initially refers to the sheet size included in the print settings obtained in step S102.

In step S1302, the CPU 101 determines whether the sheet width is greater than or equal to a lower limit value of a fixable sheet width in extended gamut printing based on the sheet size referred to in step S1301. The fixable sheet width refers to a sheet width at which no fixing failure due to insufficient fixing temperature for the amount of toner occurs even during image formation by extended gamut printing. The fixable sheet width corresponds to the white area in the chart of FIG. 9B. As illustrated in FIG. 9B, the lower limit value of the sheet width at which no fixing failure occurs varies depending on the length of the sheet in the conveyance direction. In the present exemplary embodiment, the white area in FIG. 9B represents the range where printing can be performed by applying the maximum amount of toner applicable by extended gamut printing without causing a fixing failure.

If the size of the sheet to be printed is less than the lower limit value of the sheet width (NO in step S1302), the processing proceeds to step S117 of FIG. 10B. Specifically, the CPU 101 makes a notification that extended gamut printing is not executed with the current print settings. On the other hand, if the size of the sheet to be printed is greater than or equal to the lower limit value of the sheet width (YES in step S1302), the processing proceeds to step S1303.

In step S1303, the CPU 101 determines whether the sheet width is less than or equal to an upper limit value of the fixable sheet width in extended gamut printing based on the sheet size referred to in step S1301. The upper limit value of the fixable sheet width refers to the upper limit value of the sheet width corresponding to the white area in the chart of FIG. 9B. In the example of FIG. 9B, the upper limit value is 297 mm. If the sheet size is less than or equal to the upper limit value of the sheet width (YES in step S1303), the processing proceeds to step S120 of FIG. 10B. In other words, since the sheet width falls between the upper and lower limit values and within the range where extended gamut printing can be executed, other determination processes for determining whether to execute extended gamut printing are performed.

On the other hand, if the sheet size is greater than the upper limit value of the sheet width (NO in step S1303), the processing proceeds to step S1304. In step S1304, the CPU 101 refers to a margin amount of print data included in the print settings obtained in step S102. The processing proceeds to step S1305.

In step S1305, the CPU 101 identifies a drawing area in which drawing is performed on the recording medium based on the margin amount referred to in step S1304. The CPU 101 then determines whether the identified drawing area has a width less than or equal to the upper limit value of the width illustrated in FIG. 9B. The width of the drawing area corresponding to a length over which an image can be drawn in a direction perpendicular to the conveyance direction of the recording medium. The CPU 101 can identify the width of the drawing area by subtracting the lengths of the margins at both sides from the sheet width indicated by the sheet size.

If the width of the drawing area is greater than the upper limit value, sufficient fixing temperature may fail to be provided at sheet ends (range beyond the upper limit value). However, if no image is drawn at the sheet ends, extended gamut printing can be executed since the drawing processing is not affected by the insufficient fixing temperature. In the present exemplary embodiment, if the width of the drawing areas is less than or equal to the upper limit value (YES in step S1305), the processing proceeds to step S120 of FIG. 10B.

The present exemplary embodiment has been described using a case where the upper limit value used in the determination of step S1303 and the upper limit value used in the determination of step S1305 are the same. However, this is not restrictive. The upper limit value used in the determination of step S1305 may be smaller than that used in the determination of step S1303.

In step S1305, if the width of the drawing area is determined to be greater than the upper limit value (NO in step S1305), the processing proceeds to step S1306.

In step S1306, the analysis unit 1201 analyzes the drawing state of the image in the end areas. The end areas correspond to the areas beyond the width that allows extended gamut printing to be performed, illustrated in FIG. 9B. To analyze the drawing state, the analysis unit 1201 performs processing for deriving the maximum amount of toner and the average amount of toner applied to the end areas. After such analysis processing (image analysis), the processing proceeds to step S1307.

In step S1307, the CPU 101 determines whether the maximum amount of toner applied to the end areas is less than or equal to a threshold of the maximum amount of applied toner (third threshold) based on the result of the image analysis. If the maximum amount of toner applied to the end areas is less than or equal to the third threshold (YES in step S1307), the processing proceeds to step S1308. On the other hand, if the maximum amount of toner applied to the end areas is greater than the third threshold (NO in step S1307), the processing proceeds to step S117 of FIG. 10B. Specifically, the CPU 101 makes a notification that extended gamut printing is not executed with the current print settings.

In step S1308, the CPU 101 determines whether the average amount of toner applied to the end areas is less than or equal to a threshold of the average amount of applied toner (fourth threshold) based on the result of the image analysis. If the average amount of toner applied to the end areas is less than or equal to the fourth threshold (YES in step S1308), the processing proceeds to step S120 of FIG. 10B. In other words, since the amount of toner applied to the end areas falls within the fixable range and extended gamut printing can be executed, other determination processes for determining whether to execute extended gamut printing are performed.

On the other hand, if the average amount of toner applied to the end areas is greater than the fourth threshold (NO in step S1308), the processing proceeds to step S117 of FIG.

10B. Specifically, the CPU 101 makes a notification that extended gamut printing is not executed with the current print settings.

By the processing of steps S1306 to S1308, the execution of extended gamut printing can be permitted although the identified drawing area exceeds the range indicated by the range information (chart) of FIG. 9B, provided that the amount of toner applied outside the range indicated by the range information satisfies the predetermined upper limit.

By the foregoing processing, if the width of the image to be actually formed falls within a predetermined range and image formation by extended gamut printing will not cause a fixing failure due to insufficient fixing temperature for the amount of toner, extended gamut printing can be executed.

Even if extended gamut printing is designated and an image is formed even outside the predetermined range, the amount of toner of the image applied outside the predetermined area can be small. In such a case, extended gamut printing can be executed since no fixing error due to insufficient fixing temperature occurs.

In the present exemplary embodiment, if the width of the drawing area is determined to be greater than the upper limit value in step S1305, the processing of steps S1306 to S1308 is performed. However, the processing of steps S1306 to S1308 may be omitted. In such a case, if the width of the drawing area is determined to be greater than the upper limit value in step S1305, the processing proceeds to step S117 of FIG. 10B to make a notification that extended gamut printing is not executed with the current print settings.

The contents of the display made in step S117 are not limited to those illustrated in FIG. 11D. If the drawing area is determined to exceed the upper limit in step S1305, the CPU 101 may make a notification that extended gamut printing is not executed because the drawing area exceeds a predetermined range.

According to the present exemplary embodiment, the executability of extended gamut printing can be determined in detail. According to the present exemplary embodiment, the possibility that the user can execute extended gamut printing increases and the user's convenience can thus be increased, compared to the first exemplary embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A control apparatus for controlling a printing apparatus including (a) an exposure unit configured to expose a photosensitive drum, and (b) a developing unit configured to develop an electrostatic latent image formed by the exposure unit by using a developer on the developing unit, the control apparatus comprising:
a control unit configured to perform operations including:
(i) permitting printing with a first setting and a simplex setting made,
(ii) permitting printing with a second setting and the simplex setting made,
(iii) permitting printing with the first setting and a duplex setting made, and
(iv) prohibiting printing with the second setting and the duplex setting made,
wherein the second setting is a setting to set, for expanding color gamut expressed by the printing apparatus, a peripheral speed of the developing unit relative to a peripheral speed of the photosensitive drum that is faster than the peripheral speed of the developing unit relative to the peripheral speed of the photosensitive drum to be set by the first setting.

2. The control apparatus according to claim 1, wherein the control apparatus is a controller for controlling the printing apparatus.

3. The control apparatus according to claim 1, wherein the printing apparatus is a printer.

4. The control apparatus according to claim 1, wherein the printing apparatus includes a fixing unit configured to fix an image developed by the developing unit to a sheet.

5. The control apparatus according to claim 1, wherein the control apparatus includes a processor.

6. The control apparatus according to claim 1, wherein prohibiting printing includes cancelling printing, and permitting printing includes not cancelling printing.

7. The control apparatus according to claim 1, wherein, in a case where another setting is made under circumstances where (a) printing with the first setting and the simplex setting made is permitted in view of the first setting and the simplex setting made, (b) printing with the second setting and the simplex setting made is permitted in view of the second setting and the simplex setting made, and (c) printing with the first setting and the duplex setting made is permitted in view of the first setting and the duplex setting made, the other setting made prohibits at least one of the following: printing (a), printing (b), or printing (c).

8. The control apparatus according to claim 7, wherein the other setting made is a setting of a sheet size.

9. The control apparatus according to claim 1, wherein the control unit is configured to perform further operations including:
determining whether the second setting and the duplex setting are made, and prohibiting printing based on a determination that the second setting and the duplex setting are both made, and not prohibiting printing based on a determination that the second setting and the duplex setting are not both made.

10. The control apparatus according to claim 1, wherein the printing apparatus includes an intermediate transfer body configured to have an image developed by the developing unit transferred, and a fixing unit configured to fix the image on the intermediate transfer body to a sheet.

11. The control apparatus according to claim 1, wherein the peripheral speed of the developing unit set by the second setting is the same as the peripheral speed of the developing unit set by the first setting, and the peripheral speed of the photosensitive drum set by the second setting is slower than the peripheral speed of the photosensitive drum set by the first setting.

12. A control method for controlling a printing apparatus including (a) an exposure unit configured to expose a photosensitive drum, and (b) a developing unit configured to develop an electrostatic latent image formed by the exposure unit by using a developer on the developing unit, the control method comprising:
   (i) permitting printing with a first setting and a simplex setting made;
   (ii) permitting printing with a second setting and the simplex setting made;
   (iii) permitting printing with the first setting and a duplex setting made; and
   (iv) prohibiting printing with the second setting and the duplex setting made,
   wherein the second setting is a setting to set, for expanding color gamut expressed by the printing apparatus, a peripheral speed of the developing unit relative to a peripheral speed of the photosensitive drum that is faster than the peripheral speed of the developing unit relative to the peripheral speed of the photosensitive drum to be set by the first setting.

13. The control method according to claim 12, wherein the printing apparatus is a printer.

14. The control method according to claim 12, wherein the printing apparatus includes a fixing unit configured to fix an image developed by the developing unit to a sheet.

15. The control method according to claim 12, wherein prohibiting printing includes cancelling printing, and permitting printing includes not cancelling printing.

16. The control method according to claim 12, wherein, in a case where another setting is made under circumstances where (a) printing with the first setting and the simplex setting made is permitted in view of the first setting and the simplex setting made, (b) printing with the second setting and the simplex setting made is permitted in view of the second setting and the simplex setting made, and (c) printing with the first setting and the duplex setting made is permitted in view of the first setting and the duplex setting made, the other setting made prohibits at least one of the following: printing (a), printing (b), or printing (c).

17. The control apparatus according to claim 16, wherein the other setting made is a setting of a sheet size.

18. The control method according to claim 12, further comprising:
   determining whether the second setting and the duplex setting are made; and
   prohibiting printing based on a determination that the second setting and the duplex setting are both made, and not prohibiting printing based on a determination that the second setting and the duplex setting are not both made.

19. The control method according to claim 12, wherein the printing apparatus includes an intermediate transfer body configured to have an image developed by the developing unit transferred, and a fixing unit configured to fix the image on the intermediate transfer body to a sheet.

20. The control method according to claim 12, wherein the peripheral speed of the developing unit set by the second setting is the same as the peripheral speed of the developing unit set by the first setting, and the peripheral speed of the photosensitive drum set by the second setting is slower than the peripheral speed of the photosensitive drum set by the first setting.

\* \* \* \* \*